(No Model.)
I. W. McGAFFEY.
ROTARY SPRINKLER.
No. 353,955.                    Patented Dec. 7, 1886.
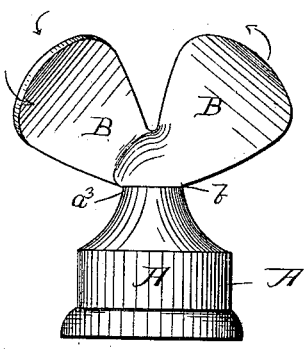
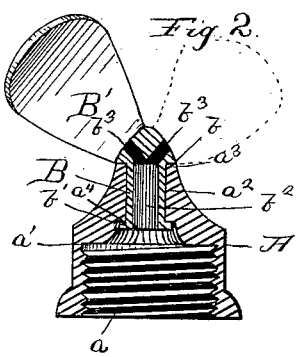
Witnesses:
Lew. E. Curtis.
A. W. Munday,
Inventor:
Ives W. McGaffey.
By Munday, Evarts & Adcock
his Attorneys:

UNITED STATES PATENT OFFICE.

IVES W. McGAFFEY, OF CHICAGO, ILLINOIS, ASSIGNOR TO EVERETT B. PRESTON AND GEORGE E. PRESTON, OF SAME PLACE.

ROTARY SPRINKLER.

SPECIFICATION forming part of Letters Patent No. 353,955, dated December 7, 1886.

Application filed September 13, 1886. Serial No. 213,357. (No model.)

*To all whom it may concern:*

Be it known that I, IVES W. McGAFFEY, a citizen of the United States, residing at Chicago, in the county of Cook and State of Illinois, have invented a new and useful Improvement in Rotary Sprinklers, of which the following is a specification.

My invention relates to rotary sprinklers for garden-hose.

The object of my invention is to provide a rotary sprinkler of a cheap and simple construction which will distribute the water evenly over an extended area.

My invention consists, in connection with a base or nozzle piece, of a rotary sprinkler wheel or device having one or more, preferably two, bent leaves or blades and a hollow shank journaled on the nozzle piece or base and provided with one or more, preferably two, inclined water-ways, through which the jet or jets of water are projected against the curved leaves or blades. By this means the wheel, with its blades, is caused to revolve rapidly, and as the jets of water strike the blades the water is thrown by the centrifugal action to a comparatively great distance and evenly distributed over a wide area. By curving or bending the blades more or less the spray may be thrown to a greater or less height. The hollow shank or shaft of the rotary wheel is secured to the base or nozzle piece by swaging or otherwise forming a flange or collar thereon after said shank is inserted through the nozzle or base piece. The leaves or blades of the rotary wheel may be longitudinally fluted or grooved, and they may also be given any desired outline or curvature.

In the accompanying drawings, which form a part of this specification, and in which similar letters of reference indicate like parts, Figure 1 is a side elevation of a rotary sprinkler embodying my invention, and Fig. 2 is a central longitudinal section thereof.

In said drawings, A represents the base or nozzle piece of the sprinkler, which may be secured either to the coupling, with which the garden-hose are usually provided, or attached to the end of an ordinary nozzle. It is provided with interior screw-threads, $a$, for this purpose, and a seat, $a'$, for a suitable gasket or packing.

B is the hollow shank of the rotary sprinkler, journaled in a suitable hole or bearing, $a^2$, in the end of the nozzle-piece A, and having a pair of diverging bent leaves or blades, B' B', and a shoulder, $b$, which fits against the end $a^3$ of the base-piece A.

The hollow shank B projects through the shell of the base-piece, and its end is swaged or turned, forming an inner shoulder or collar, $b'$, which fits against a corresponding seat or shoulder, $a^4$, on the base-piece. The hole or water-passage $b^2$ in the shank B diverges at its upper end into two inclined passages, $b^3$ $b^3$, by which the jets of water are directed against the revolving bent leaves or blades B' B'.

As the jet-holes $b^3$ $b^3$ are in the revolving sprinkler-wheel, the jets are continuously projected with full force against the bent leaves or blades of the wheel, and thus cause it to revolve rapidly, and by their centrifugal force to throw the water to a considerable distance and distribute it evenly. As the jets strike the bent leaves or blades of the wheel the blades spread the jet into a fan-like sheet.

It is preferable to use two bent leaves or blades on the wheel. If only one is used, the hollow shaft of the wheel will have but one inclined water-way, $b^3$, instead of two.

I hereby disclaim the devices shown and described in Letters Patent No. 147,966 to Palmieri, No. 216,920 to Weber, No. 270,664 to Henderson and Schutz, and No. 347,359 to Lawson.

In my invention I employ a rotary sprinkler operating by its centrifugal action to throw and spread the water, which is mounted in the axial line of the nozzle, and the shank of which is hollow and journaled in the nozzle-piece, and provided with inclined water-ways, which project jets of water against the blades of the revolving wheel, and thus cause said wheel to revolve rapidly and throw the water by its centrifugal action. By this means, as the inclined water-ways are formed in the revolving shank of the wheel, the jets revolve with the wheel and always strike the blades in the most effective position to cause its rotation, and at the same time, owing, also, to the radial location of the water-ways in the revolving shank and their inclination toward the axis of said shank, the jets as they strike the revolving wheel cause no retarding reaction upon the same.

I claim—

1. The combination of the attachment or nozzle piece A with a rotary sprinkler wheel or device having a hollow shank journaled thereon and a bent leaf or blade, said hollow shank being integral with said wheel or blade and revolving with it, and having an axially-inclined water-way through which the jet is projected against said bent leaf or blade, substantially as specified.

2. The combination, with an attachment piece, A, of a revolving sprinkler wheel or device having a hollow shank, B, a pair of divergent water-ways, $b^3$ $b^3$, and a pair of bent or curved blades, B' B', said water-ways being inclined away from the axis of said revolving hollow shank and serving to project the jets against said blades, substantially as specified.

3. The combination of attachment or nozzle piece A with hollow shank B, having shoulder $b$, collar or flange $b'$, divergent water-ways $b^3$ $b^3$, and bent leaves or blades B' B', against which the water is projected as it issues through said divergent ways, said hollow shank fitting inside said nozzle-piece and journaled to revolve thereon, and said water-ways being radially inclined away from the axis of said shank, substantially as specified.

IVES W. McGAFFEY.

Witnesses:
H. M. MUNDAY,
LEW. E. CURTIS.